April 9, 1957 H. C. HEBERT ET AL 2,788,136

METHOD AND APPARATUS FOR HANDLING SHEET METAL CANS FOR STORAGE AND SHIPMENT

Filed April 18, 1955 7 Sheets-Sheet 1

INVENTORS
HAROLD C. HEBERT
SAMUEL S. NICHOLSON
BY Charles H. Erne
Leland R. McCann
George W. Reiber
ATTORNEYS April 9, 1957 H. C. HEBERT ET AL 2,788,136

METHOD AND APPARATUS FOR HANDLING SHEET METAL CANS FOR STORAGE AND SHIPMENT

Filed April 18, 1955 7 Sheets-Sheet 2

INVENTOR.
HAROLD C. HEBERT
SAMUEL S. NICHOLSON
BY Charles H. Erne
Leland R. McCann
George W. Reiber
ATTORNEYS INVENTORS
HAROLD C. HEBERT
SAMUEL S. NICHOLSON
BY Charles H. Erne
Leland A. McCann
George W. Reiber
ATTORNEYS April 9, 1957 H. C. HEBERT ET AL 2,788,136

METHOD AND APPARATUS FOR HANDLING SHEET METAL CANS FOR STORAGE AND SHIPMENT

Filed April 18, 1955 7 Sheets-Sheet 4

INVENTORS
HAROLD C. HEBERT
SAMUEL S. NICHOLSON
BY Charles H. Erne
Leland A. McCann
George W. Reiber
ATTORNEYS April 9, 1957 H. C. HEBERT ET AL 2,788,136
METHOD AND APPARATUS FOR HANDLING SHEET
METAL CANS FOR STORAGE AND SHIPMENT
Filed April 18, 1955 7 Sheets-Sheet 5

INVENTORS
HAROLD C. HEBERT
SAMUEL S. NICHOLSON
BY Charles H. Erne
Leland R. McCann
George W. Deiler
ATTORNEYS INVENTOR.
HAROLD C. HEBERT
SAMUEL S. NICHOLSON
BY Charles H. Erne
Laland R. McCann
George W. Reiber
ATTORNEYS INVENTORS
HAROLD C. HEBERT
SAMUEL S. NICHOLSON
BY Charles H. Erne
Leland R. McCann
George W. Reifer
ATTORNEYS 2,788,136

METHOD AND APPARATUS FOR HANDLING SHEET METAL CANS FOR STORAGE AND SHIPMENT

Harold C. Hebert, Tampa, Fla., and Samuel S. Nicholson, Westwood, N. J., assignors to American Can Company, New York, N. Y., a corporation of New Jersey Application April 18, 1955, Serial No. 502,026

13 Claims. (Cl. 214—83.22)

The present invention relates to a method of and apparatus for handling damageable articles to be stored and/or transported and has particular reference to handling sheet metal cans or containers in bulk in jumbled piles for storage in and delivery from stationary or transportable bins, enclosures, compartments or other storage structures.

In the can making industry, finished empty cans are usually shipped to customers immediately after being manufactured. In some instances, however, they are temporarily stored in the manufacturer's plant until required by the customer. In either event, the cans are discharged from the manufacturing lines at high speeds in substantially continuous procession into runways which deliver them to the shipping or storage sections of the plant. Here the cans heretofore have either been packed in orderly layers in paper bags or carriers which have then been transferred to a transport conveyance or in-plant storage compartment, or taken directly from the runways and stacked in the transport conveyance or storage compartment in an orderly arrangement in rows and tiers. In the latter case, the stacks have been built up manually by operators by manipulation of a large pronged fork which enables them to handle ten to twenty cans at a time.

Each of these conventional methods of handling cans has serious disadvantages. The paper bags in themselves are expensive and require the use of complicated and costly automatic packing equipment. Furthermore, the bulky bags must be moved at least once when they are transferred from the packing station to the transport conveyance or storage compartment, and then once again when they are unloaded from these structures. These movements add considerably to the labor costs chargeable to the handling of cans. In addition, the bags must be cut open to permit removal of the cans therefrom, which operation also adds to the labor costs.

The other conventional method of can handling, i. e. the manual stacking of the empty cans in orderly rows and tiers, also presents serious problems in that the increasingly higher speeds of can manufacturing equipment, which in many instances have reached or exceeded the rate of 500 cans per minute per line, have made it increasingly difficult for the stacking operators to keep up with the production of cans. As a result, the production of the can manufacturing lines must occasionally be temporarily stopped to enable these operators to remain abreast of the output of cans. Such stoppage is highly undesirable in that it creates serious manufacturing problems and results in lost production of the expensive manufacturing equipment. Furthermore, this tedious and expensive manual handling of the cans must be repeated when they are unloaded.

The present invention provides a novel method of and apparatus for handling cans which make it possible to eliminate all of the above-mentioned disadvantages which are seemingly inherent in any system wherein the cans must be arranged in orderly stacks. We have found that substantial savings in time and labor can be effected when the cans are gently fed or poured directly from the discharge runway into a can-confining enclosure in such a manner as to build up a jumbled pile or load which substantially fills the enclosure and in which the cans are disposed in completely haphazard or random positions. The can-confining enclosure includes a movable can-contacting bottom wall which preferably comprises a conveyor, and a pair of can-contacting side walls which may be formed either as solid wall structures or as nonrigid belt type structures and which are movable with the conveyor. The enclosure also has front and back can-contacting end walls which may or may not be movable with the conveyor, and is mounted on a support which may be either a stationary frame or a transportable structure such as a truck or trailer body which permits the cans to be transported to the customer's plant and unloaded there.

When it is desired to unload the cans, the whole jumbled pile is shifted as a unit relative to the enclosure support to progressively move the cans to a place of discharge and thus cause them to fall by gravity onto a take away device or conveyor for delivery to any desired place of deposit. During this shifting of the pile, it is essential that relative movement between individual cans and between the cans and the bottom and side walls of the enclosure be avoided as much as possible in order to prevent damage to the cans.

The shifting of the jumbled pile of cans as a unit towards the place of discharge is primarily effected by moving the bottom can-contacting conveyor wall of the enclosure, since it is this conveyor wall which supports most of the weight of the piled cans. In order to permit the cans to fall from the enclosure, the bottom wall of the enclosure is removed progressively from beneath the cans at the place of discharge. In order to prevent turbulence within the jumbled pile of cans as it moves relative to the enclosure support, it is essential that both of the side walls of the enclosure also move simultaneously with the bottom wall in the same direction and at substantially the same speed. If the side walls are not thus moved, the cans at the side edges of the pile, which cans are pressed against the side walls with considerable force by the weight of the pile, will scrape or roll along the side walls with consequent damage to themselves. Furthermore the turbulence which the scraping or rolling of these cans would engender within the pile would result in damage to other cans within the interior of the pile.

The success of the present invention hinges upon the fact that the empty cans flow from the jumbled piles much in the same manner as would any granular product, such as grain or sugar. In effect, each can behaves as a granule with the result that the flow of cans from the enclosure is surprisingly smooth and actually results in less damage to the containers than do the old handling methods.

An object, therefore, of the instant invention is the provision of a method of and apparatus for handling empty cans in jumbled piles or loads in a manner which protects the cans from damage and which considerably reduces the time and expense of loading and unloading the cans.

Another object is the provision of such a method of and apparatus for handling empty cans in jumbled loads which is applicable to transportable as well as stationary storage structures so that cans may be readily loaded into and delivered from trailer trucks and the like without damage.

Another object is to provide for progressively maintaining a gentle, continuous, granular flow of cans from a jumbled pile at the discharge end of a delivery or storage enclosure.

Still another object is to provide for movement of certain enclosure walls in time with the unloading of the piled cans to prevent relative movement between the cans and the walls and to thus prevent turbulence within the pile.

Numerous other objects and advantages of the invention will be apparent as it is better understood from the following description, which, taken in connection with the accompanying drawings, discloses, a preferred embodiment thereof.

Referring to the drawings.

As a preferred or exemplary embodiment of the instant invention the drawings illustrate a method of and apparatus for storing and discharging sheet metal cans or containers A (Figs. 5 to 11 inclusive) in a manner which is economical and speedy and which also protects the cans from injury. Although the drawings show a transportable structure (trailer truck) for housing the cans during storage it should be understood that the invention is equally well adapted to storage structures which are not transportable, such as bins used in can manufacturing plants for temporary storage purposes.

Figure 1:
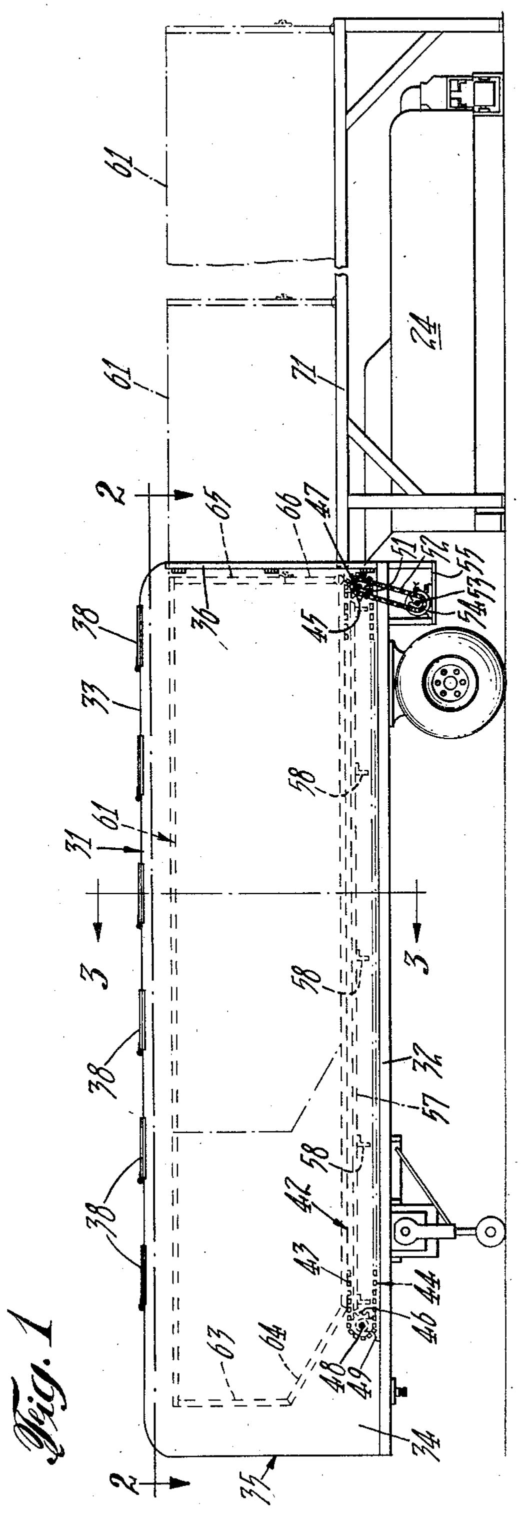
Figure 1 is a side elevation of one form of transportable structure embodying the apparatus of the instant invention and utilized for storing and delivering cans in bulk form in accordance with the method steps of the instant invention.
Figure 2:
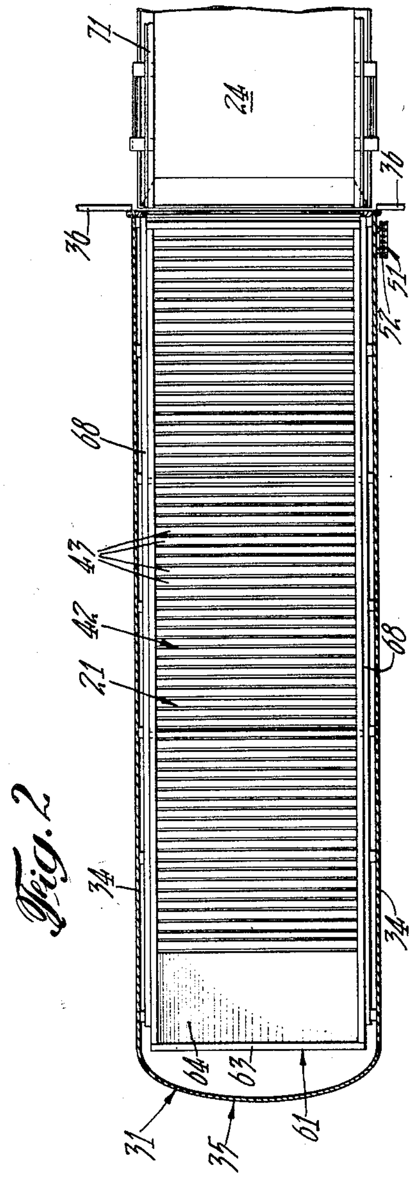
Fig. 2 is a sectional view taken substantially along the line 2—2 in Fig. 1, with parts broken away.
Figure 4:
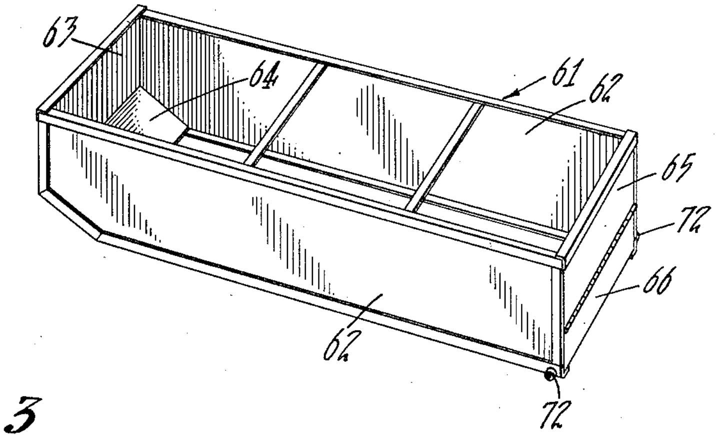
Fig. 4 is a perspective view of a component of a transportable storage enclosure used in the apparatus shown in Fig. 1.
Figure 3:
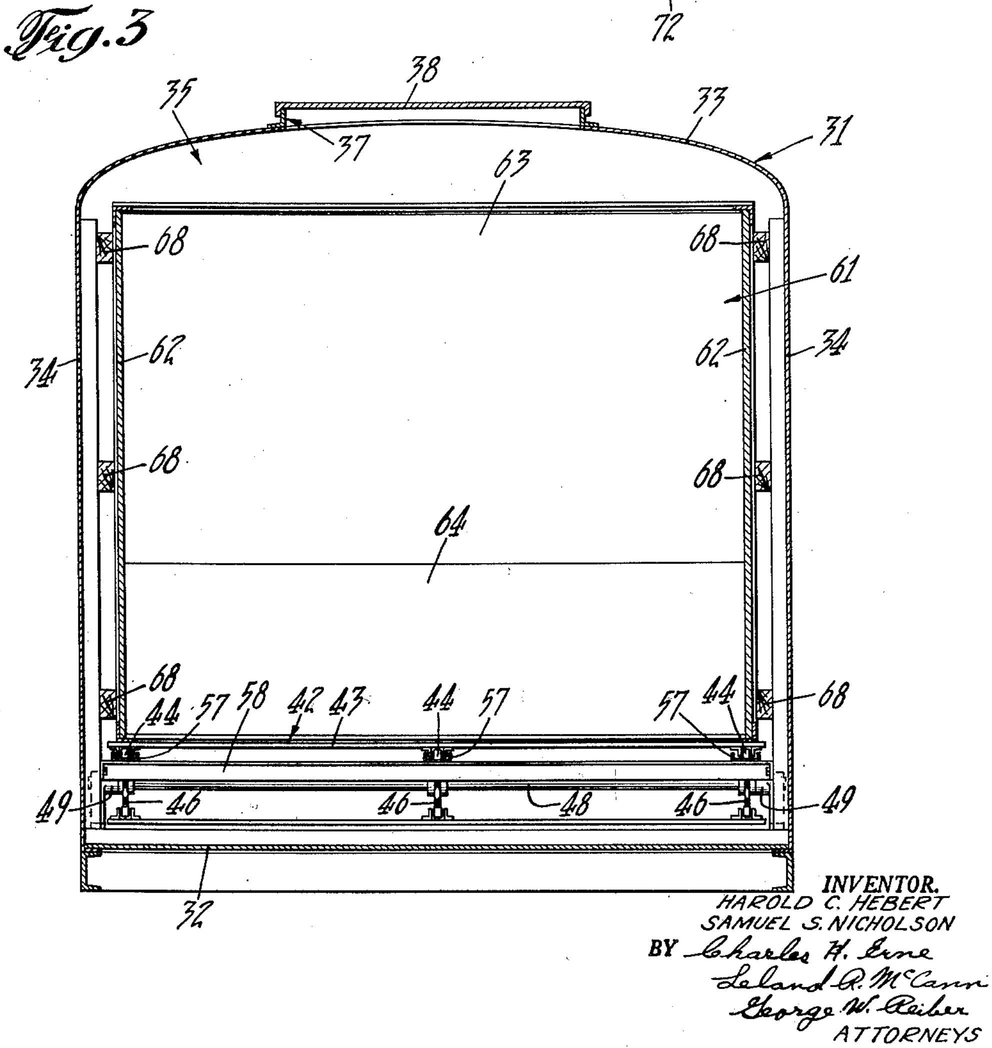
Fig. 3 is an enlarged transverse sectional view taken substantially along the line 3—3 in Fig. 1.
Figure 5:
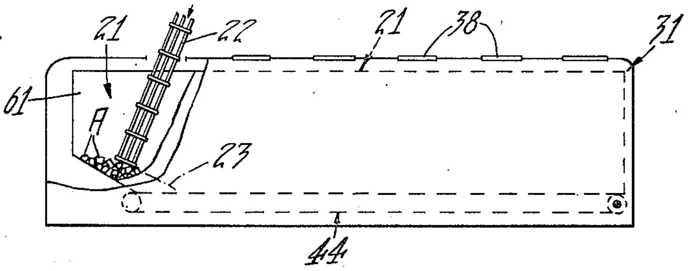
Figs. 5, 6, 7 and 8 are schematic views illustrating how the apparatus shown in Fig. 1 is progressively filled with cans for storage.
Figure 6:
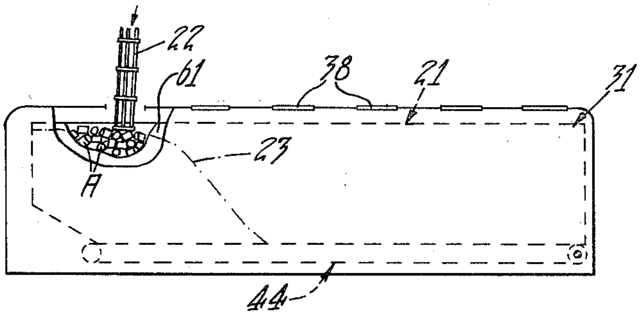
Figure 7:
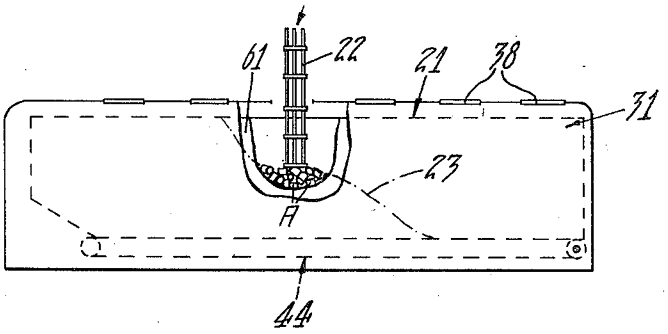
Figure 8:
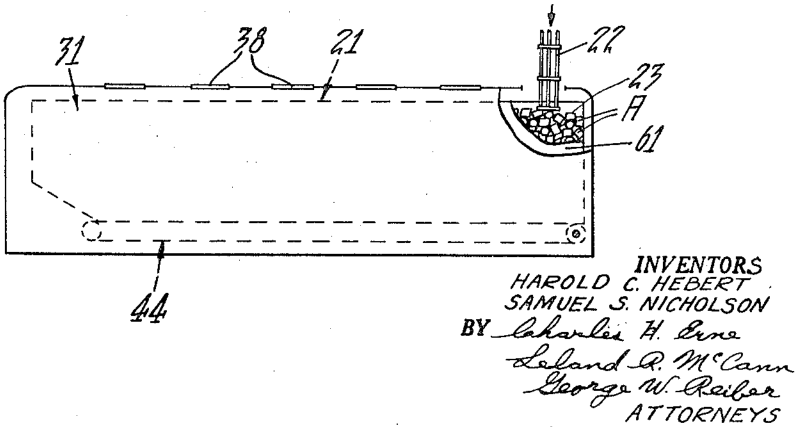
Figure 15:
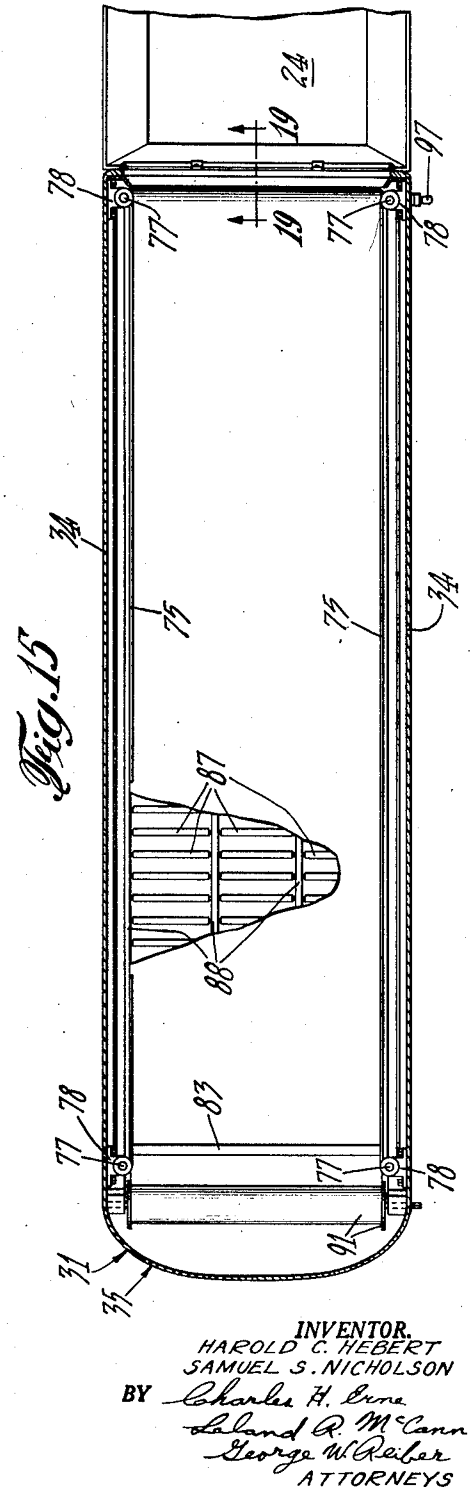
Fig. 15 is a sectional view taken substantially along the line 15—15 in Fig. 14, with parts broken away.

The method of handling the cans A for storage and delivery is schematically illustrated in Figs. 5 to 11 inclusive of the drawings and includes the steps of loading and delivering cans A in a steady flow into and from a storage enclosure 21 defined by side walls, an end wall and a bottom wall which are movable in unison as shown in Figs. 1, 2 and 15. This enclosure may be transportable or nontransportable. The cans A preferably are received directly from the can manufacturing lines and are conveyed along suitable runways in a substantially continuous procession to a flexible or movable loading chute 22 manipulatable manually into any position by an operator.

In starting to load a storage enclosure 21 the operator first directs the discharge end of the loading chute 22 to a position adjacent the bottom of the enclosure within a few inches thereof and permits the cans to roll from the chute gently onto the bottom or floor of the enclosure to begin the building up of a haphazard or jumbled bulk form pile 23. As the pile 23 builds up, the operator manipulates the chute 22 vertically and laterally to keep its discharge end within a short distance of the pile to permit the cans to flow gently into place on the pile without injury and to thus distribute the cans vertically and horizontally over the face of the pile as the latter gradually enlarges until the enclosure 21 is completely filled for storage.

While the cans A are thus in storage in the enclosure 21, the complete enclosure and its unit load of cans may be transported for example from the can manufacturing plant to the customer's filling plant, or, if the enclosure is of the nontransportable type as used in a can manufacturing plant, the cans may be held in storage until needed and then transferred to a portable enclosure for delivery to a customer.

Figure 9:
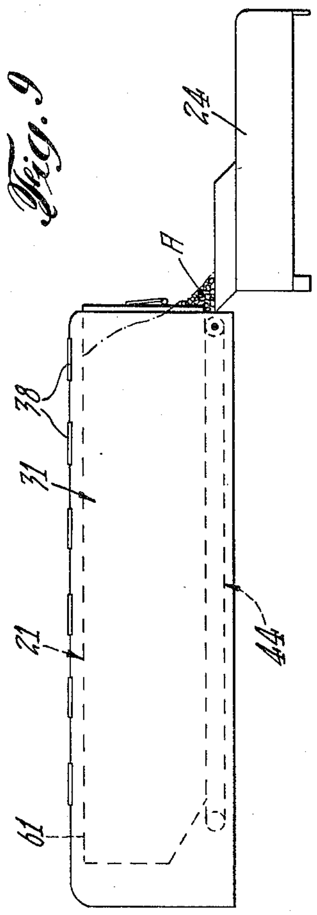
Figs. 9, 10 and 11 are schematic views illustrating how the apparatus shown in Fig. 1 progressively delivers the cans from storage.
Figure 10:
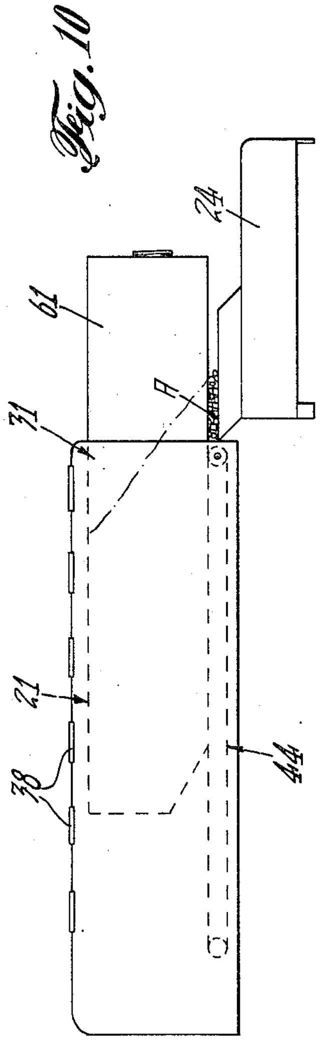
Figure 11:
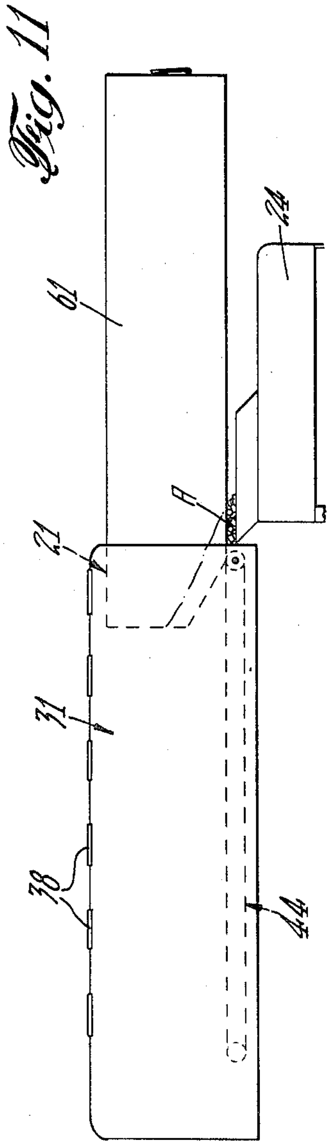

In discharging the cans A from the enclosure 21, the support of certain of the cans adjacent the bottom of the enclosure is taken away to expose and permit those cans to fall by gravity a short distance within a predetermined range of fall, onto a receiving device for transfer to any suitable place of deposit. By way of example, the drawings in Figs. 9 to 11 show a receiving device 24, which preferably is a conveyor which carries the cans to a conventional unscrambling machine which arranges them in desired positions and advances them in timed order for use for example in a filling machine or the like.

As the support under the cans is gradually removed and the exposed cans flow gently from the pile in the enclosure 21 to the receiving device 24, the supported portion of the unit load is shifted to an unsupported position to progressively release the cans until all the cans in the pile have been delivered to the receiving device 24. During this period the remaining or supported cans in the pile are maintained immovable relative to each other and relative to the confining walls of the enclosure so as to protect these remaining cans against compression or frictional contact and thereby protect them against deformation, scratching and other injury.

This protection of the cans A preferably is effected by simultaneous movement of at least the side and the bottom wall of the enclosure 21 in time with the dissipation of the pile so that the cans in the remaining portion of the pile remain in piled position relative to each other without dislocation or sliding against the walls of the enclosure.

Figures 16, 17, 18, 19:
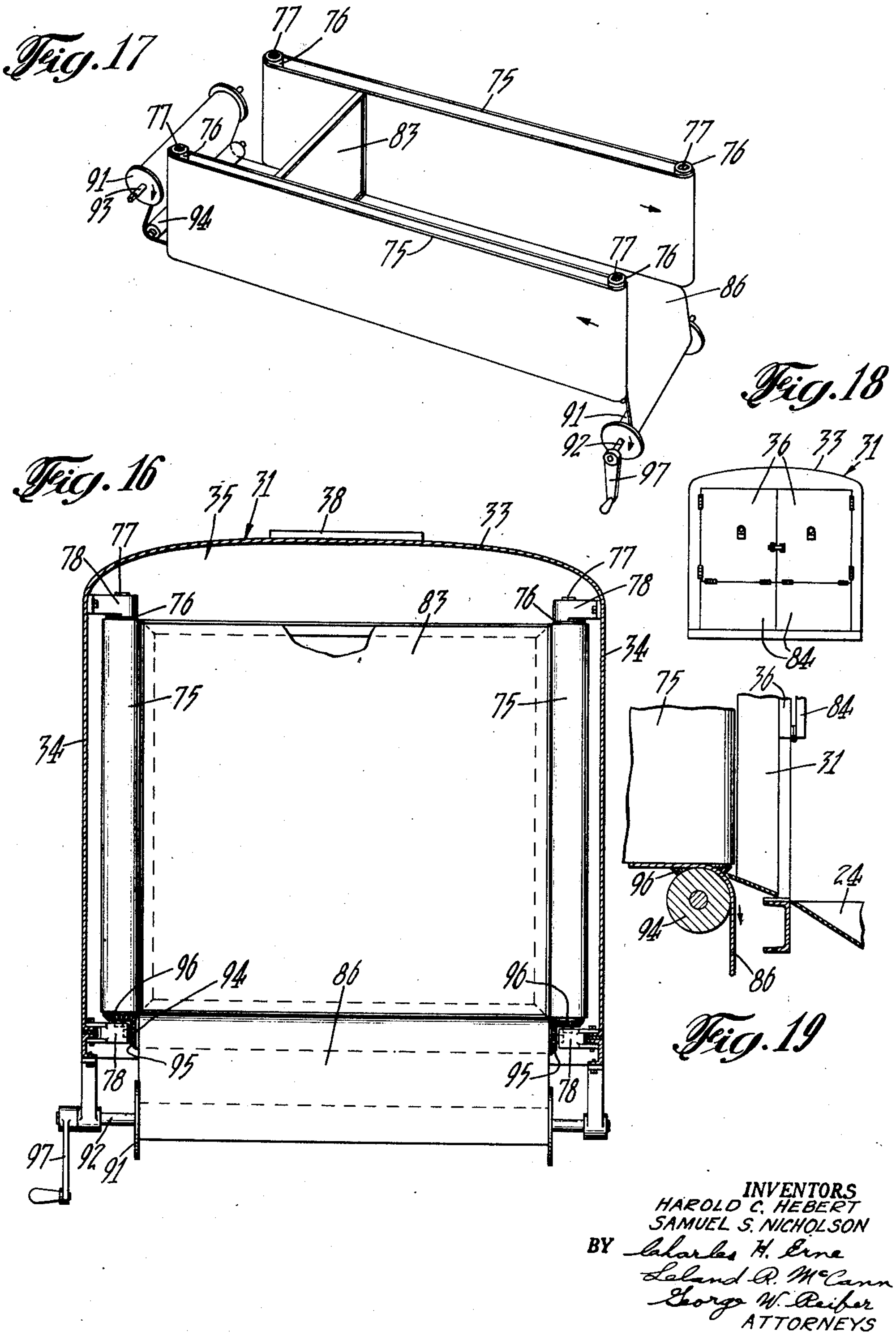
Fig. 16 is an enlarged transverse section taken substantially along the broken line 16—16 in Fig. 14.
Fig. 17 is a perspective view of certain of the moving parts used in the apparatus shown in Fig. 14.
Fig. 18 is a reduced scale rear view of the apparatus shown in Figs. 12 and 14.
Fig. 19 is an enlarged sectional detail as taken substantially along the line 19—19 in Fig. 15.

One form of apparatus used for carrying out this method of storing and delivering bulk loaded cans A is illustrated in Figs. 1, 2, 3 and 4 of the drawings. This form of apparatus is movable or transportable and preferably is embodied in a trailer truck provided with a closed, protective external trailer body 31 having a floor 32, roof or ceiling 33, side walls 34, a curved front wall 35 at one end of the body and hingedly connected doors 36 (Figs. 1 and 16) at the other or delivery end of the body. A plurality of filling openings or hatches 37 (Figs. 1 and 3) having covers 38 are provided in the roof 33 at spaced intervals along the length of the body to permit filling the cans A into the body.

The trailer body 31 is provided with an endless conveyor 42 which is mounted inside the body, adjacent the floor 32 and which constitutes the can-contacting and supporting movable bottom of an enclosure or storage structure in which the cans A are piled for transportation. This conveyor extends for nearly the full width and length of the body, starting at the discharge end of the body. The conveyor 42 preferably comprises closely spaced transverse slats 43 secured to a set of three spaced and parallel endless roller chains 44 (Fig. 3) which operate over a set of three spaced actuating sprockets 45 located at the discharge end of the body and over a set of three idler sprockets 46 disposed adjacent the opposite end of the body. The three actuating sprockets 45 are mounted on an actuating shaft 47 carried in suitable bearing blocks secured to the floor 32 of the body.

In a similar manner the three idler sprockets 46 are mounted on an idler shaft 48 carried in bearing brackets 49 secured to the floor 32 of the body. One end of the actuating shaft 47 extends beyond the width of the trailer body 31 and carries a sprocket 51 for actuating the conveyor. The sprocket is connected by an endless driving chain 52 to a sprocket 53 on a drive shaft of an electric motor 54 supported on a bracket 55 depending from the trailer body floor 32. Intermediate the actuating sprockets 45 and the idler sprockets 46 the conveyor chains 44 roll on longitudinal tracks 57 supported on a plurality of spaced and parallel transversely extending support rails 58, the ends of which are secured to the side walls 34 of the trailer body 31.

The slat conveyor 42 forms the bottom of the can confining enclosure 21 of the present invention. The enclosure also includes a movable shell 61 (Fig. 4) which is disposed within the trailer body 31 and rests upon the conveyor 42. The shell 61 (Fig. 4) preferably is formed with side walls 62, a front wall 63 which terminates near its bottom in an inwardly sloping wall 64, and a rear wall 65 disposed adjacent the discharge end of the trailer body and preferably having a hinged door 66 near its bottom. The bottom and the top of the shell 61 are open. The shell 61 extends nearly the full length and width of the interior space of the trailer body 31. Guide rails 68 secured to the inner walls 34 of the body are provided to locate and guide the shell 61 within the body 31.

It should be understood that if the present invention is utilized to store the cans within the manufacturing plant, the protective external body 31 may not be necessary. In such a case, the conveyor 42 and shell 61 may be mounted on a stationary support or platform which would also carry the guide rails 68.

The storage enclosure 21 is utilized to hold and confine a unit load of the cans A. With the enclosure 21 disposed in the trailer body 31 and the rear doors 36 of the body closed, the cans A are piled in the enclosure at the can manufacturing plant through the hatches 37 in the roof of the body in the manner explained hereinbefore in connection with the method steps of the invention. The cans thus entering the enclosure 21 rest on the upper run of the slat conveyor 42. When the enclosure 21 is filled, the covers 38 of the hatches 37 are closed and the trailer body 31 is transported, for example, to the customers plant. Here the trailer body 31 is backed up to the receiving device 24 and the rear doors 36 of the body are opened. The slat conveyor 42 is then set in motion through operation of the electric motor 54, in a direction which propels its upper run toward the place of discharge at the back end of the body. The conveyor 42 travels at a slow rate of speed preferably in the range of from 2 to 3 linear feet a minute.

The travel of the upper run of the conveyor 42 slowly carries the shell 61 and the pile of cans A out of the open back end of the trailer body, causing the shell 61 to overhang the conveyor 42 thus progressively shifting the pile to an unsupported position and exposing the cans at the place of discharge. This permits the exposed and unsupported cans A to fall or flow by gravity from the enclosure 21 onto the receiving device 24. The distance between the level of the upper run of the conveyor 42 and the upper level of the receiving device 24 is fixed within the predetermined limits hereinbefore mentioned to allow the cans to flow or glide gently without damage.

The hinged door 66 on the rear wall 65 of the shell 61 may be opened at the beginning of this discharge of the cans to the receiving device 24, to facilitate starting of the discharge, if desired. As the cans A fall onto the receiving device 24 they are carried to an unscrambling machine or other suitable place of deposit.

As the conveyor 42 continues to operate slowly, the shell 61 moving with the conveyor is progressively projected out of the trailer body 31 as shown in Figs. 1, 9, 10 and 11. A frame 71 (Fig. 1) is provided over the receiving device 24 to support the overhanging end of the shell 61 and rollers 72 (Fig. 4) are provided on the rear end of the shell 61 to facilitate its advancement along the frame. The advancement of the storage shell 61 out of the trailer body 31 preferably is timed with the dissipation of the pile of cans in the enclosure 21 so as to as nearly as possible keep the edge of the pile from which the cans are gently flowing, constantly adjacent the discharge end of the slat conveyor 42 to effect continuous and gentle discharge of the cans from the enclosure 21.

During this discharge of the cans A, the cans still supported on the slat conveyor 42 are maintained in piled formation against movement relative to each other and relative to the confining walls of the enclosure 21 because the shell 61 and the cans therein move with the conveyor 42 as a unit. This prevents agitation of the cans in the pile and thus protects them against being scratched, marred, dented, deformed or against flange injuries so that they are in good condition upon discharge.

Figures 12, 13:
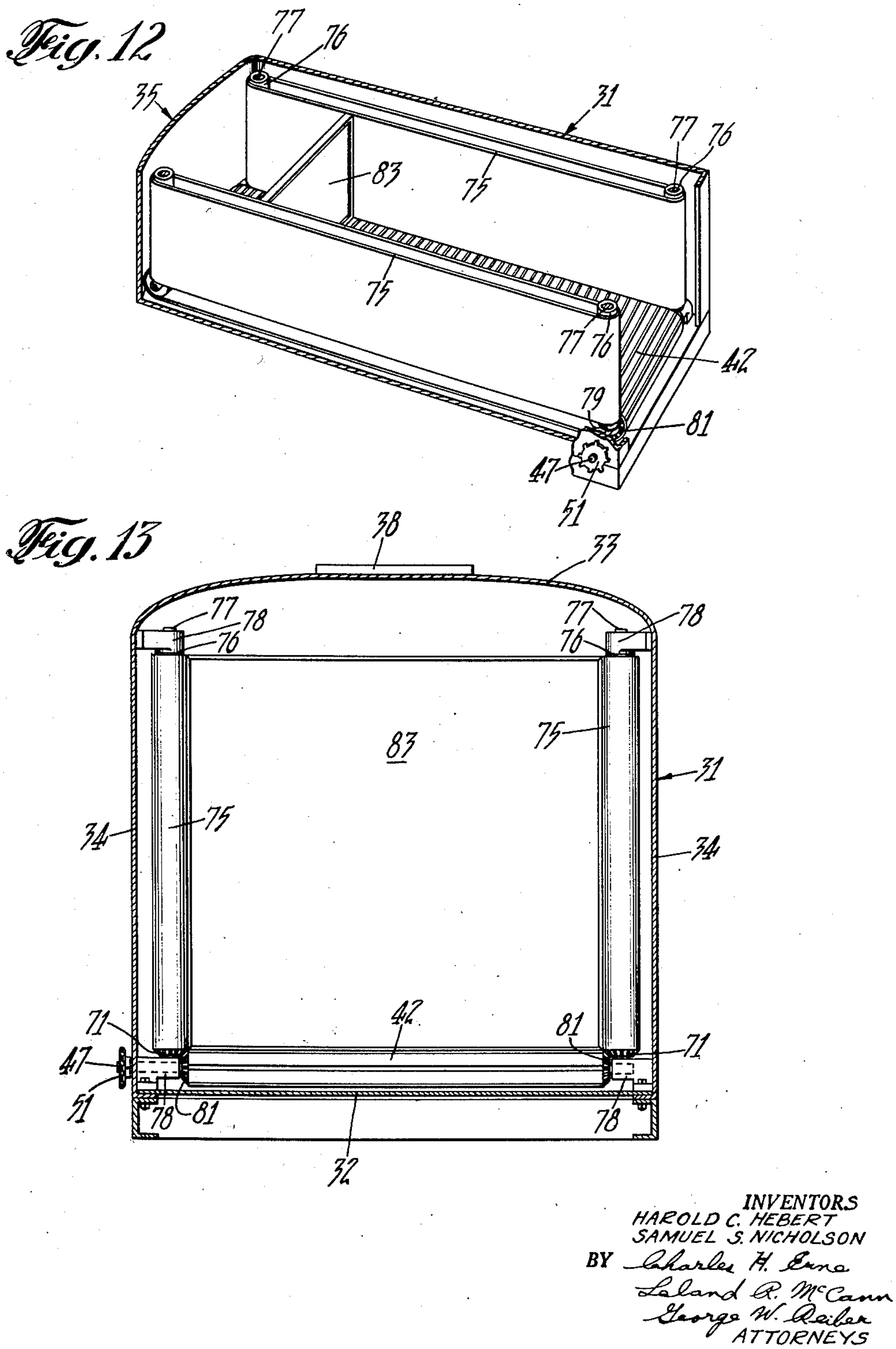
Fig. 12 is a perspective view of a modified form of the apparatus shown in Fig. 1.
Fig. 13 is a sectional view similar to Fig. 3 and showing the modified form of the invention illustrated in Fig. 12.
Figure 14:
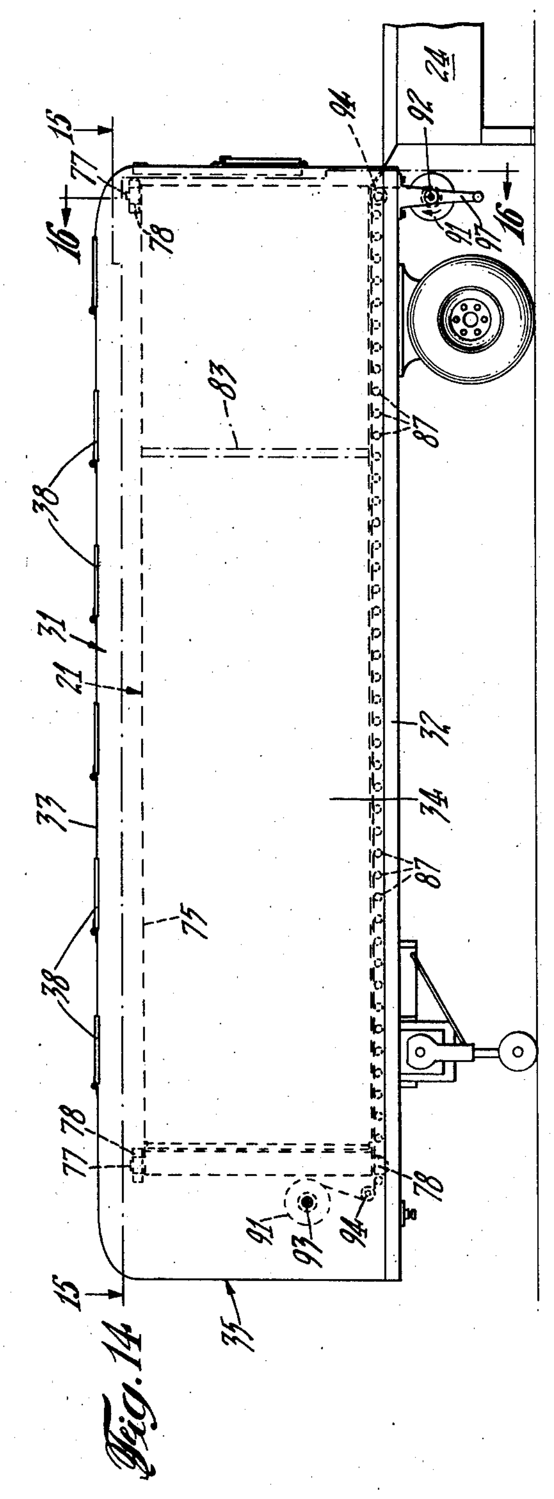
Fig. 14 is a side elevation of a further modified form of the apparatus shown in Fig. 1.

In a modified form of the apparatus as shown in Figs. 12 and 13 the rigid shell of 61 (Fig. 4) of the preferred form is dispensed with and a pair of opposed endless side wall belts 75 are substituted. These belts 75 are disposed adjacent the side walls 34 of the trailer body 31 and extend for nearly the full length and height of the body. The belts 75 operate over vertically disposed pulleys 76 mounted adjacent the ends of the body on vertical shafts 77 the ends of which are carried for rotation in bearing blocks 78 secured to the side walls 34 of the body 31. The lower ends of the two shafts 77 adjacent the discharge end of the body 31 carry bevel gears 79 (Fig. 13) which mesh with and are driven by bevel gears 81 carried on the slat conveyor actuating shaft 47. Through this connection the side wall belts 75 move in unison with the slat conveyor 42 to advance the unit load of cans A toward the discharge end of the body 31 without relative movement of the cans in the same manner as explained hereinbefore in connection with the rigidly movable shell 61 of the preferred form shown in Figs. 1 through 11.

Although the front wall 35 of the trailer body 31 may be used as a vertical confining wall of the enclosure 21, it is preferred to provide a movable confining wall or plate 83 (Fig. 12) disposed between the belts 75 to facilitate movement of the unit load of cans. This confining plate 83 preferably is secured to the two belts 75 and extends across the slat conveyor 42 for its full width and extends upwardly for the full height of the belts. The plate 83, belts 75 and conveyor 42 together with the rear doors 36 of the body thereby constitute the can-confining enclosure for the reception and delivery of the cans A in the same manner as in the preferred form of the apparatus and the method steps of the invention. In this modified form of the apparatus the rear doors 36 of the trailer body are provided with transversely hinged lower sections or flaps 84 (Fig. 18) which are opened to start delivery of the cans to the receiving device 24.

In a further modified form of the apparatus as shown in Figs. 14 to 19 inclusive, the movable side wall belts 75, the confining wall or plate 83 and the rear doors 36 are utilized in connection with a can supporting movable bottom confining web or flexible floor 86 (Fig. 17) to form the general enclosure 21. The web 86 is supported on a plurality of idle rollers 87 extending transversely of the floor of the trailer body 31 and freely rotatable in bearing rails 88 which extend longitudinally of the body and are secured to the body floor. The ends of the web 86 are secured to actuating rollers or drums 91, located at the ends of the trailer body 31 and mounted on actuating shafts 92, 93. Between the actuating rollers 91 and the web supporting roller 87 the web travels over a pair of broad pulleys 94 mounted on rotatable shafts carried in bearing blocks secured to the side walls 34 of the body 31.

At the delivery end of the body, the pulley shaft carries a pair of bevel gears 95 (Fig. 16) which mesh with and drive bevel gears 96 mounted on the lower ends of the vertical shafts 77 of the side wall belt pulleys 76 so as to move the belts 75 and confining wall or plate 83 in unison with the bottom web 86. In this form of the apparatus the confining plate 83 preferably is secured to the web 86 as well as the side belts 75.

In delivering the unit load of cans A from the body 31, the bottom web 86 is wound up on the roller 91 at the discharge end of the body. This may be effected through an electric motor to rotate the roller 91 in the proper direction or by a hand crank 97 (Figs. 16, 17) which may be attached to the shaft 92 on which the roller is mounted. By rotation of the shaft 92 in the direction indicated by the arrow in Fig. 17, the web 86, the side belts 75, and the front confining plate 83 are all moved in unison toward the discharge end of the body 31 to progressively deliver the cans A to the receiving device 24 in the same manner as heretofore explained. Upon discharge of all the cans of the unit load, the travel of the web 86 is reversed by applying the crank 97 to the shaft 93 (Fig. 17) of the front roller 91 and thus reversely winding the web up onto this roller, thus returning the confining plate 83 to its original position at the front of the body for a repeat loading and delivery operation.

It is thought that the invention and many of its attendant advantages will be understood from the foregoing description, and it will be apparent that various changes may be made in the form, construction, and arrangement of parts of the apparatus mentioned herein and in the steps and their order of accomplishment of the method described herein, without departing from the spirit and scope of the invention or sacrificing all of its material advantages, the apparatus and method hereinbefore described being merely a preferred embodiment thereof.

We claim:

1. An apparatus for bulk storing and discharging articles such as sheet metal cans without damage, comprising a movable truck provided with a closed protective body, an endless belt conveyor mounted in said body and terminating at a place of discharge of said articles, an open topped and open bottomed shell disposed within said protective body, said shell having article confining side and end walls and being supported on and movable with said belt conveyor and forming with said conveyor an enclosure for confining and supporting a jumbled load of said articles, a plurality of covered hatches provided in the top of said closed protective body to facilitate loading of said enclosure with said articles, means at the discharge end of said body to permit discharge of said articles from said enclosure, actuating means for moving said endless belt conveyor toward said place of discharge to project said shell gradually out of an end of said body beyond the termination of said conveyor to effect movement of said load of articles without shifting said articles relative to each other and relative to the confining walls of said enclosure and to progressively remove the bottom support from the articles in said enclosure as said shell is projected to deliver the articles from the bottom of said enclosure, and means for supporting said shell as it is projected from said body.

2. An apparatus for bulk storing and discharging articles such as sheet metal cans without damage, the combination of an enclosure including movable side walls and a movable bottom conveyor wall for confining and supporting a jumbled load of said articles, said side walls comprising endless belt conveyors and said bottom wall terminating at a place of discharge of said articles and comprising a web having its ends secured to wind up drums disposed at opposite ends of said enclosure, an end wall attached to said side walls and to said web for movement with said conveyors and said web, means for mounting said enclosure, and actuating means for moving said side walls and said bottom wall of said enclosure relative to said mounting means at the same rate of travel in a direction toward said place of discharge to effect movement of said load of articles without shifting said articles relative to each other and relative to said side and bottom confining walls of said enclosure to advance said load of articles gradually without damage beyond said place of discharge and thereby progressively remove the bottom support from said articles to discharge said articles from said enclosure, said actuating means comprising means for rotating said drums to effect travel of said web in opposite directions.

3. An apparatus of the character defined in claim 2 wherein said endless belt conveyors have a driving connection with said web for simultaneous actuation by said web.

4. A method of handling and delivering sheet metal cans in bulk by truck transportation, which comprises mounting on a truck movable side and bottom walls for supporting and confining a jumbled load of empty cans, gently and gradually building up in said truck in contact with said walls a jumbled load of cans to be delivered, moving said truck to deliver said load of cans to a destination, and at said destination moving said movable walls at the same speed and in the same direction relative to said truck to shift the entire load of cans progressively beyond a discharge end of said truck while simultaneously removing said bottom wall from beneath said load at said discharge end to expose the cans to gravity to discharge the cans from the truck.

5. A method of handling and delivering sheet metal cans in bulk by truck transportation, which comprises providing a truck having a protective outer body formed with hatches in its roof, providing within said body an open topped inner enclosure comprising bottom and side can-contacting walls, introducing cans through the hatches of said outer body to build up a jumbled load of cans within said inner enclosure, and thereafter progressively moving the bottom and side can-contacting walls of said enclosure relative to said outer body at a common speed toward a place of discharge and simultaneously removing said bottom can-contacting wall from beneath the cans at said place of discharge to thereby progressively shift said cans to non-supported position without harmful scraping along said enclosure walls so that they are discharged from said enclosure without damage.

6. An apparatus for bulk storing and discharging articles such as sheet metal cans without damage, comprising in combination a movable truck provided with an outer protective body, said body including side walls and a roof, a bottom conveyor wall mounted in the bottom of said body and terminating at the rear end of said body, a pair of inner movable side walls disposed within said protective body in substantial parallelism with the side walls of said body and cooperating with said bottom conveyor wall to form an inner enclosure to support a jumbled load of said articles, means formed in the upper portion of said outer body to facilitate the introduction of said articles into said inner enclosure to form a jumbled load, means disposed at the front and rear ends of said enclosure to maintain said load against endwise movement during storage and transportation, and means for moving said bottom conveyor wall and said movable inner side walls toward the rear of said outer body at the same rate of travel to effect rearward movement of said load of articles without scraping of said articles along the side and bottom supporting walls of said enclosure to progressively remove the bottom support from the articles as said load is moved to effect discharge of said articles from said truck.

7. An apparatus for bulk storing and discharging articles such as sheet metal cans without damage, comprising a movable truck provided with an outer protective body, said body including side walls, a roof, and a front and a rear wall, an endless belt conveyor mounted at the bottom of said outer body, a pair of endless belt conveyors mounted respectively adjacent each side wall of said outer body and in substantial parallelism therewith, all of said endless belt conveyors cooperating to form an inner enclosure to confine and support a jumbled load of said articles, a plurality of covered hatches formed in the roof of said outer body to facilitate the introduction of said articles into said body to form a jumbled load, means formed in the rear wall of said outer body to permit discharge of said cans from said body, and means for moving said endless belt conveyors toward the rear of said body at a common speed to effect rearward movement of said load of articles without shifting said articles relative to each other and for progressively removing the bottom support from the articles as said load is moved to effect discharge of said articles from said truck.

8. An apparatus of the character defined in claim 7 wherein said enclosure is provided with an end wall which is attached to and movable with said side wall endless belt conveyors.

9. An apparatus for bulk storing and discharging articles such as sheet metal cans without damage, comprising in combination a movable truck provided with an outer protective body, said body including side walls, a top wall and a front wall, a bottom conveyor wall mounted in the bottom of said body and terminating at the rear end of said body, an inner shell disposed in said protective body and positioned on and supported by said bottom conveyor wall and cooperating with said bottom conveyor wall to form an inner enclosure adapted to confine and support a jumbled load of said articles, said shell having an open top and an open bottom and being provided with front, rear and side walls, means formed in said outer body adjacent the top of said shell to facilitate loading of said articles into said enclosure, means for moving said shell and said bottom conveyor wall rearwardly with respect to said outer body at the same rate of travel to project said shell gradually out of the rear end of said outer body to effect movement of said load of articles without scraping said articles along the walls of said enclosure and to progressively remove the bottom support from the articles as said shell is projected to deliver the articles from the bottom of said shell as it is projected from said body.

10. The apparatus of claim 9 wherein said outer protective body is provided with a rear wall section which may be moved to permit projection of said shell from said body.

11. The apparatus of claim 9 wherein means are provided between the side walls of said outer body and the side walls of said inner shell to guide said shell as it is moved relative to said body.

12. The apparatus of claim 9 wherein the lower portion of the front wall of said inner shell is inclined inwardly in order to permit complete discharge of all of the articles in said enclosure without requiring complete withdrawal of said shell from said outer body.

13. The apparatus of claim 9 wherein means are provided for supporting said shell as it is projected from said body.

References Cited in the file of this patent

UNITED STATES PATENTS

| | | |
|---|---|---|
| 261,339 | Grove | July 18, 1882 |
| 1,932,995 | Coppinger | Oct. 31, 1933 |
| 2,013,750 | Dupree et al. | Sept. 10, 1935 |
| 2,264,157 | Baker et al. | Nov. 25, 1941 |
| 2,406,992 | Butler | Sept. 3, 1946 |
| 2,515,334 | Buye et al. | July 18, 1950 |
| 2,584,361 | Morine | Feb. 5, 1952 |
| 2,717,089 | Hebert | Sept. 6, 1955 |

FOREIGN PATENTS

| | | |
|---|---|---|
| 148,935 | Sweden | Aug. 15, 1931 |